June 6, 1950     P. SUSSENBACH     2,510,727

SEALING COMPOSITION

Filed May 15, 1946

Paul Sussenbach,
Inventor.
Haynes and Koenig,
Attorneys.

Patented June 6, 1950

2,510,727

UNITED STATES PATENT OFFICE 2,510,727

SEALING COMPOSITION

Paul Sussenbach, St. Louis, Mo., assignor to The Presstite Engineering Company, St. Louis, Mo., a corporation of Missouri Application May 15, 1946, Serial No. 669,802

6 Claims. (Cl. 260—33.2)

This invention relates to a sealing composition and, more particularly, to a sealing composition for sealing a spot-welded seam.

Among the several objects of the invention may be noted the provision of an improved sealing composition adapted to be applied to the seam between lapped metal plates prior to spot welding thereof; the provision of a sealing composition having a comparatively low electrical resistance so as not to increase substantially the current required for welding; the provision of a plastic sealing composition which is adapted to be squeezed in the seam by the welding electrodes to effect a tight and permanent seal; the provision of such a composition which retains its plasticity and low electricity resistance indefinitely so that a considerable interval may elapse between its application to the seam and the welding operation; and the provision of a sealing composition of this class which is adapted to withstand caustic treating processes to which the metal plates may be subjected after spot welding thereof. Other objects will be in part obvious and in part pointed out hereinafter.

The invention accordingly comprises the ingredients and combinations of ingredients, the proportions thereof, and features of composition, which will be exemplified in the products hereinafter described, and the scope of the application of which will be indicated in the following claims.

In the accompanying drawings, in which one of various possible embodiments of the invention is illustrated, Fig. 1 is an exploded view showing two plates about to be brought together for welding and illustrating one mode of application of my new sealing material;

Similar reference characters indicate corresponding parts throughout the several views of the drawings.

Figure 1:
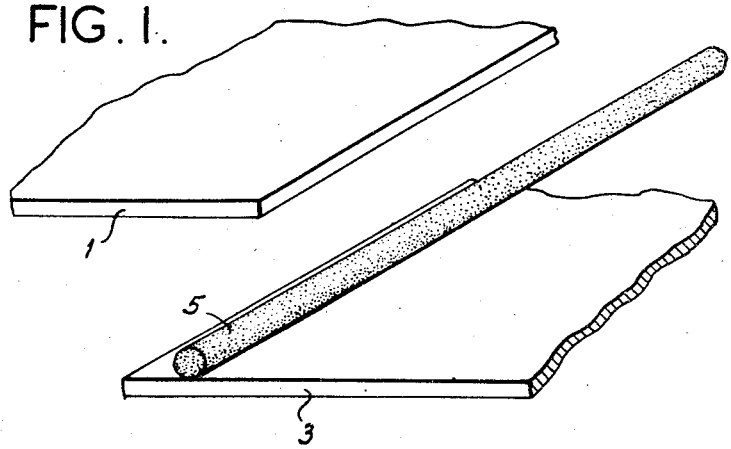
Figure 2:
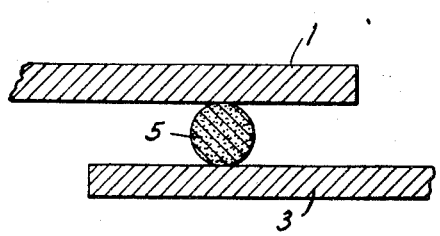
Fig. 2 is a vertical section showing the two plates in engagement with a bead of the sealing composition.
Figure 3:
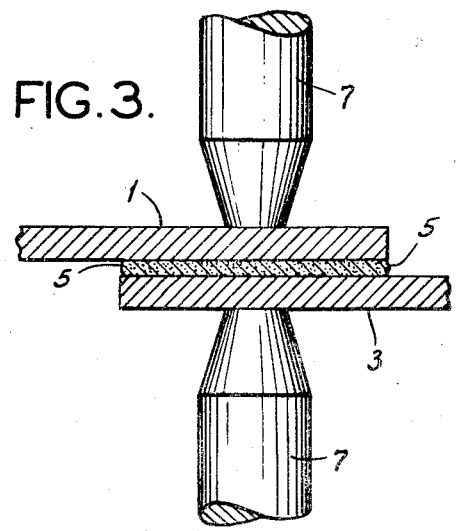
Fig. 3 is a vertical section showing the plates forced together by the welding electrodes and the bead squeezed out flat between the plates; and, Fig. 4 is a view similar to Fig. 3 but showing conditions at the end of the welding operation with the electrodes about to be removed.
Figure 4:
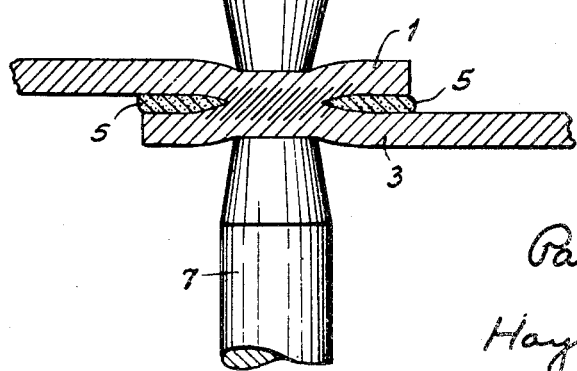

Referring now to the drawings, numerals 1 and 3 indicate metal plates whose margins are to be lapped and spot welded. A round bead 5 of the plastic sealing composition of this invention, to be particularly described hereinafter, is extruded along the margin of one of the plates. The other plate is then brought into engagement with the bead, as indicated in Fig. 2. The welding electrodes 7 are then applied at spaced points along the seam under the usual pressure. The pressure of the electrodes forces the plates toward one another and squeezes the bead flat (Fig. 3). Upon passage of the welding current through the electrodes, plates, and sealing composition, the plates are squeezed closer together and become welded together at the said spaced points along the seam, as illustrated in schematic fashion in Fig. 4. The heat generated by the welding current melts the sealing composition in the area between the electrodes, the melted material flowing outward from this area and permitting the plates to be forced into contact over this area by the pressure of the electrodes. Upon cooling, the composition returns to plastic condition and seals the seam along its entire length and around the spot welds.

It is desirable that the sealing composition shall not impose an unduly high resistance to the passage of the welding current. It is also desirable not only that the sealing composition shall be initially in a plastic state, so that it may be applied in a comparatively thick layer between the plates and subsequently squeezed out flat, but also that it shall retain its plasticity indefinitely. This is because in practice a considerable length of time may elapse between the application of the sealing composition to the seam and the squeezing and welding operation, and also because it is desirable to have the seal remain flexible throughout substantially the life of the apparatus which carries the weld.

An example of a sealing composition having these desirable characteristics is as follows:

| Item | Function | Ingredient | Percentage by weight |
|---|---|---|---|
| 1 | Bonding Material | Paraplex[1] | 44.0 |
| 2 | Pigment | Whiting | 28.0 |
| 3 | Filler | Chrysotile | 15.0 |
| 4 | Electrical Conductor | Graphite | 1.5 |
| 5 | Solvent | Ethylene Glycol Monomethyl Ether | 3.0 |
| 6 | Diluent | Benzene or Aromatic Petroleum Naphtha | 8.5 |
| | | | 100.0 |

[1] Chemical and Engineering News, 22, 1992 (Nov. 25, 1944), which is the reaction product of one mole of each of sebacic acid, glycerol and ricinoleic acid.

Alkyd type resins, which may be modified with long chain aliphatic dicarboxylic acids, which are tacky and adhesive may be employed as the bonding material. An example of such a resin is "Paraplex" shown, for example, in "Chemical and Engineering News," 22, 1992 (Nov. 25, 1944). The preferred percentage of this item is 44% but it may range from 35% to 60%. The alkyd type resins may be replaced by a low molecular weight (less than 3,000) polybutene such as polyisobutylene.

Whiting, a specially treated limestone, may be replaced by common powdered limestone without affecting the characteristics of the sealing composition. This pigment may be entirely omitted, and its proportion may vary from 0% to 35%.

Chrysotile, or Canadian asbestos, is a form of asbestos having from 12½% to 14% of water crystallization therein. This is an essential ingredient of the composition; it has the effect of greatly lowering the electrical resistance of the composition. Other forms of asbestos having no water of crystallization therein are not nearly as satisfactory. The chrysotile is used in the form of shredded fibers having a length of the order of ⅛ of an inch. Its proportion may range from 5% to 25%.

Graphite is exemplary of an electrically conductive material. Other good electrical conductors, such as aluminum flake, may be substituted therefor. Madagascar or Ceylon crystalline graphite powdered to pass a number 200 or number 250 mesh sieve, or aluminum flakes of such size as to pass such sieves are preferred. The particles, however, may range in size from number 120 to 500 mesh. The proportion of the electrical conductor item may range from 1% to 20%.

The solvent is exemplary of organic polar solvents which not only increase the plasticity of the sealing composition but also decrease the electrical resistance thereof. Ethylene glycol monomethyl ether has been found particularly satisfactory for this purpose when combined with the chrysotile and other ingredients. Other glycols, such as ethylene glycol, ethylene glycol monomethyl ether acetate, or diethylene glycol monoethyl ether acetate may be used. Other suitable polar solvents are alcohols, such as methyl or ethyl alcohol, and ketones, such as acetone or methyl ethyl ketone. The proportion of the solvent may range from 2% to 20%.

The diluent is added to increase the initial plasticity of the sealing composition if so desired, or may be omitted. It is a fugitive ingredient and flashes away under the heat generated by the welding current. For welding thin plates a diluent having a low flash point, such as benzene or petroleum naphtha, is used. For welding relative thick plates or for welding a thin plate to a thick plate, a high flash solvent such as toluol or xylol is used. The proportion of diluent may range from 0% to 15%.

The above ingredients are thoroughly mixed to form the sealing composition. The plasticity of the composition is such that it may be readily extruded from an extrusion gun to form a round bead as it is applied along the margin of a plate. It will be understood that other modes of applying the composition to the plate may be employed, also that it need not be applied in the form of a round head. An advantage of the composition is that its plasticity is such that it may be applied in a thick layer along the margin of the plate and subsequently squeezed out flat between these plates under the pressure of welding electrodes to form a tight seal. The composition also retains its plasticity for an indefinite period after the welding operation.

The chrysotile has the effect of decreasing the electrical resistance of the composition while also functioning as a filler in the seal. It has been found that a composition including all the ingredients in the proportions above set forth has a resistance, under certain test conditions, of approximately 30 megohms, while a composition from which the chrysotile was omitted, though including the graphite, has a resistance under the same test conditions of approximately 1,000 megohms. The addition of ethylene glycol monomethyl ether or other suitable organic polar solvent has also been found to be of considerable importance in reducing the electrical resistance of the composition. The omission of the solvent from the above composition has been found to increase the resistance from 30 megohms to approximately 250 megohms, under the same test conditions. The composition retains its low electrical resistance characteristic for a substantial length of time, so as to avoid the necessity for spot welding immediately after the application of the composition to the plates.

Another advantages of the sealing composition of this invention is that it withstands caustic treating processes to which the metal plates may be subjected after they have been spot welded together. Such welded plates are often employed in the manufacture of automobile bodies in which they are cleaned and "bonderized" by caustic treating compounds. The sealing composition of this invention is such that it is not deleteriously affected by such treatment.

In view of the above, it will be seen that the several objects of the invention are achieved and other advantageous results attained.

As many changes could be made in the above products without departing from the scope of the invention, it is intended that all matter contained in the above description or shown in the accompanying drawings shall be interpreted as illustrative and not in a limiting sense.

I claim:

1. A sealing composition for a spot-welded seam, consisting essentially of 35% to 60% of a tacky, adhesive, plastic resin bonding material selected from the group consisting of alkyd resins and polybutenes, from 0% to 35% pigment, from 5% to 25% shredded chrysotile, from 1% to 20% of finely divided electrical conducting material dispersed therethrough, from 2% to 20% of an organic polar solvent for increasing the plasticity and reducing the electrical resistance of the composition, and from 0% to 15% of a diluent for increasing the initial plasticity of said composition.

2. A sealing composition for a spot-welded seam, consisting essentially by weight of approximately 44% of an alkyd type resin modified with long chain aliphatic dicarboxylic acids, approximately 28% pigment, approximately 15% shredded chrysotile, approximately 1.5% of finely divided electrical conducting material dispersed therethrough, approximately 3% ethylene glycol monomethyl ether, and approximately 8.5% petroleum naphtha.

3. A sealing composition for a spot-welded seam, consisting essentially of 35% to 60% by weight of a tacky, adhesive, plastic alkyd resin bonding material, from 0% to 35% pigment, from 5% to 25% shredded chrysotile, from 1% to 20% of finely divided electrical conducting material dispersed therethrough, from 2% to 20% of an organic polar solvent for increasing the plasticity and reducing the electrical resistance of the composition, and from 0% to 15% of a diluent for increasing the initial plasticity of said composition.

4. A sealing composition for a spot-welded seam, consisting essentially of 35% to 60% by weight of a tacky, adhesive, plastic resin bonding material consisting of an alkyd resin modified with a long chain aliphatic dicarboxylic acid, from 0% to 35% pigment, from 5% to 25% shredded chrysotile, from 1% to 20% of finely divided electrical conducting material dispersed therethrough, from 2% to 20% of an organic polar solvent for increasing the plasticity and reducing the electrical resistance of the composition, and from 0% to 15% of a diluent for increasing the initial plasticity of said composition.

5. A sealing composition for a spot-welded seam, consisting essentially of 35% to 60% by weight of a tacky, adhesive, plastic resin bonding material consisting of a polybutene having a molecular weight less than 3000, from 0% to 35% pigment, from 5% to 25% shredded chrysotile, from 1% to 20% of finely divided electrical conducting material dispersed therethrough, from 2% to 20% of an organic polar solvent for increasing the plasticity and reducing the electrical resistance of the composition, and from 0% to 15% of a diluent for increasing the initial plasticity of said composition.

6. A sealing composition for a spot-welded seam, consisting essentially of 35% to 60% by weight of a tacky, adhesive, plastic resin bonding material consisting of polyisobutylene having a molecular weight less than 3000, from 0% to 35% pigment, from 5% to 25% shredded chrysotile, from 1% to 20% of finely divided electrical conducting material dispersed therethrough, from 2% to 20% of an organic polar solvent for increasing the plasticity and reducing the electrical resistance of the composition, and from 0% to 15% of a diluent for increasing the initial plasticity of said composition.

PAUL SUSSENBACH.

REFERENCES CITED

The following references are of record in the file of this patent:

UNITED STATES PATENTS

| Number | Name | Date |
|---|---|---|
| 1,927,185 | Power et al. | Sept. 19, 1933 |
| 2,011,607 | Reeve | Aug. 20, 1935 |
| 2,066,363 | Patterson | Jan. 5, 1937 |
| 2,245,203 | Kuzmick | June 10, 1941 |
| 2,319,959 | Tierney | May 25, 1943 |
| 2,325,726 | Acker | Aug. 3, 1943 |
| 2,378,377 | Bare | June 19, 1945 |

OTHER REFERENCES

"Synthetic Resins for Coating," published 1947 by the Resinous Products and Chemical Co., Philadelphia, Pa.

"Non-Metallic Mineral," pg. 62 by R. B. Ladoo, published by The McGraw-Hill Book Co., 1925.